United States Patent
Leming

(10) Patent No.: US 10,923,735 B1
(45) Date of Patent: Feb. 16, 2021

(54) COMPLIANT CONTACT MATERIAL FOR FUEL CELLS AND METHOD OF MAKING THEREOF

(71) Applicant: BLOOM ENERGY CORPORATION, Sunnyvale, CA (US)

(72) Inventor: Andres Leming, Sunnyvale, CA (US)

(73) Assignee: Bloom Energy Corporation, San Jose, CA (US)

( * ) Notice: Subject to any disclaimer, the term of this patent is extended or adjusted under 35 U.S.C. 154(b) by 108 days.

(21) Appl. No.: 16/209,080

(22) Filed: Dec. 4, 2018

(51) Int. Cl.
| | |
|---|---|
| *H01M 8/10* | (2016.01) |
| *H01M 8/0217* | (2016.01) |
| *H01M 8/0228* | (2016.01) |
| *H01M 4/86* | (2006.01) |
| *H01M 4/88* | (2006.01) |
| *H01M 8/2465* | (2016.01) |
| *H01M 8/124* | (2016.01) |

(52) U.S. Cl.
CPC ....... *H01M 8/0217* (2013.01); *H01M 4/8668* (2013.01); *H01M 4/8673* (2013.01); *H01M 4/8832* (2013.01); *H01M 8/0228* (2013.01); *H01M 8/2465* (2013.01); *H01M 2008/1293* (2013.01)

(58) Field of Classification Search
CPC ............. H01M 8/0217; H01M 4/8668; H01M 4/8673; H01M 4/8832; H01M 4/0228; H01M 4/2465; H01M 2008/1293
See application file for complete search history.

(56) References Cited

U.S. PATENT DOCUMENTS

| | | | |
|---|---|---|---|
| 5,702,837 A * | 12/1997 | Xue | H01M 4/9066 429/465 |
| 7,951,509 B2 | 5/2011 | Cassidy et al. | |
| 9,065,127 B2 | 6/2015 | Gottmann et al. | |
| 9,823,211 B1 | 11/2017 | Allen | |
| 2006/0198812 A1* | 9/2006 | Pliszka | E03C 1/281 424/76.2 |
| 2011/0112573 A1* | 5/2011 | Bloom | A61L 24/001 606/213 |
| 2015/0311538 A1 | 10/2015 | Batawi et al. | |
| 2016/0133947 A1 | 5/2016 | Leming et al. | |

(Continued)

OTHER PUBLICATIONS

Piccardo, P. et al., "SOFC's Interconnects Materials Development," Institute for Energetics and Interphases (IENI-CNR), National Research Council and Department of Chemistry and Industrial Chemistry (DCCI), University of Genova, pp. 198-194, (2013). Available at http://www.ideal-cell.eu/files/AISOFCsTCs/AISOFC_TC_5_Piccardo_Amendola.pdf visited Dec. 4, 2018.

(Continued)

*Primary Examiner* — Raymond Alejandro
(74) *Attorney, Agent, or Firm* — The Marbury Law Group, PLLC

(57) ABSTRACT

A method of making a fuel cell stack includes applying an electrically conductive, compliant contact print ink containing an electrically conductive material, a plasticizer, a solvent, and a binder to at least one of a surface of an electrode of a fuel cell or a surface of an interconnect, and placing the fuel cell and the interconnect in the fuel cell stack such that the compliant contact print ink is located between the electrode of the fuel cell and the interconnect.

8 Claims, 3 Drawing Sheets

(56) References Cited

U.S. PATENT DOCUMENTS

2018/0029926 A1* 2/2018 Sato .................... C03C 8/20
2018/0166703 A1 6/2018 El Batawi et al.

OTHER PUBLICATIONS

England, D. M., "SOFC Interconnect Development," Semiannual Report, Delphi Corporation, pp. 1-12, (2003). Available at https://www.osti.gov/servlets/purl/833842 visited Dec. 4, 2018.
Bonnet, M. et al., "Flexidone—A New Class of Innovative PVC Plasticizers," *University of Applied Sciences Cologne and ISP Global Technologies Deutschland GmbH, Recent Advances in Plasticizers,* pp. 1-19, (2012), from www.intechopen.com.

* cited by examiner

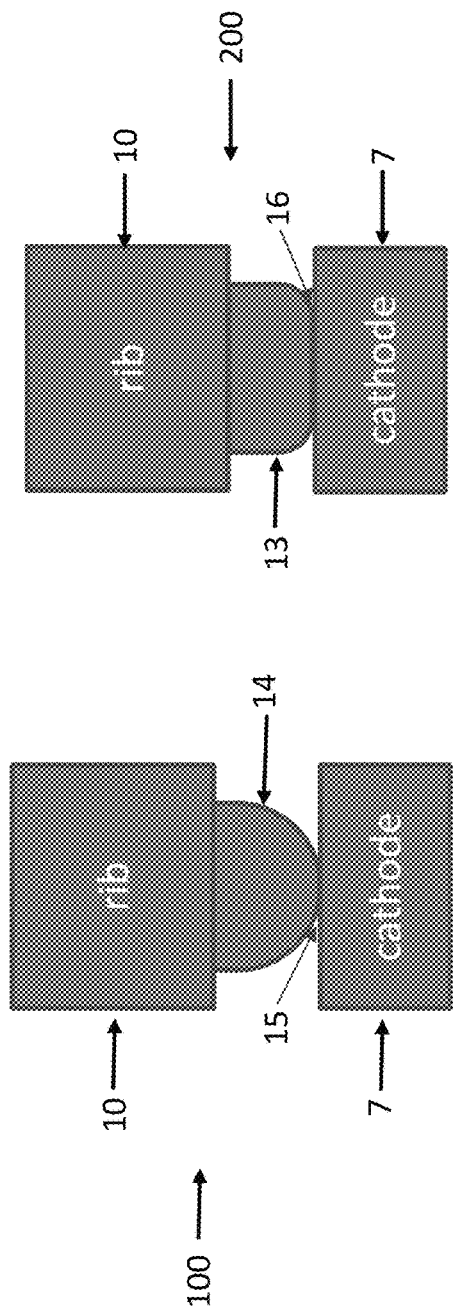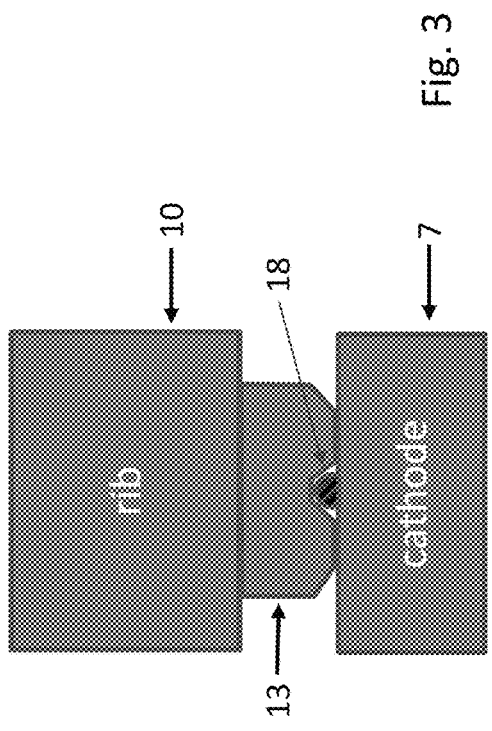

COMPLIANT CONTACT MATERIAL FOR FUEL CELLS AND METHOD OF MAKING THEREOF

FIELD

The present invention is generally directed to fuel cells, and specifically to a compliant contact material for solid oxide fuel cells and method of making thereof.

BACKGROUND

Fuel cells, such as solid oxide fuel cells (SOFC's), are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

An embodiment is drawn to a contact composition for a solid oxide fuel cell (SOFC) comprising a compliant contact print ink, the compliant contact print ink including an electrically conductive material, a plasticizer, a solvent and a binder.

Another embodiment is drawn to a method of making a fuel cell stack includes applying a compliant contact print ink containing an electrically conductive material, a plasticizer, a solvent, and a binder to at least one of a surface of an electrode of a fuel cell or a surface of an interconnect, and placing the fuel cell and the interconnect in the fuel cell stack such that the compliant contact print ink is located between the electrode of the fuel cell and the interconnect.

BRIEF DESCRIPTION OF THE DRAWINGS

FIG. 2A is a schematic illustration of a noncompliant contact material.

FIG. 2B is a schematic illustration of a compliant contact material according to an embodiment.

FIG. 3 is a schematic illustration of the compliant contact material flowing around an object.

DETAILED DESCRIPTION

Figure 1A:
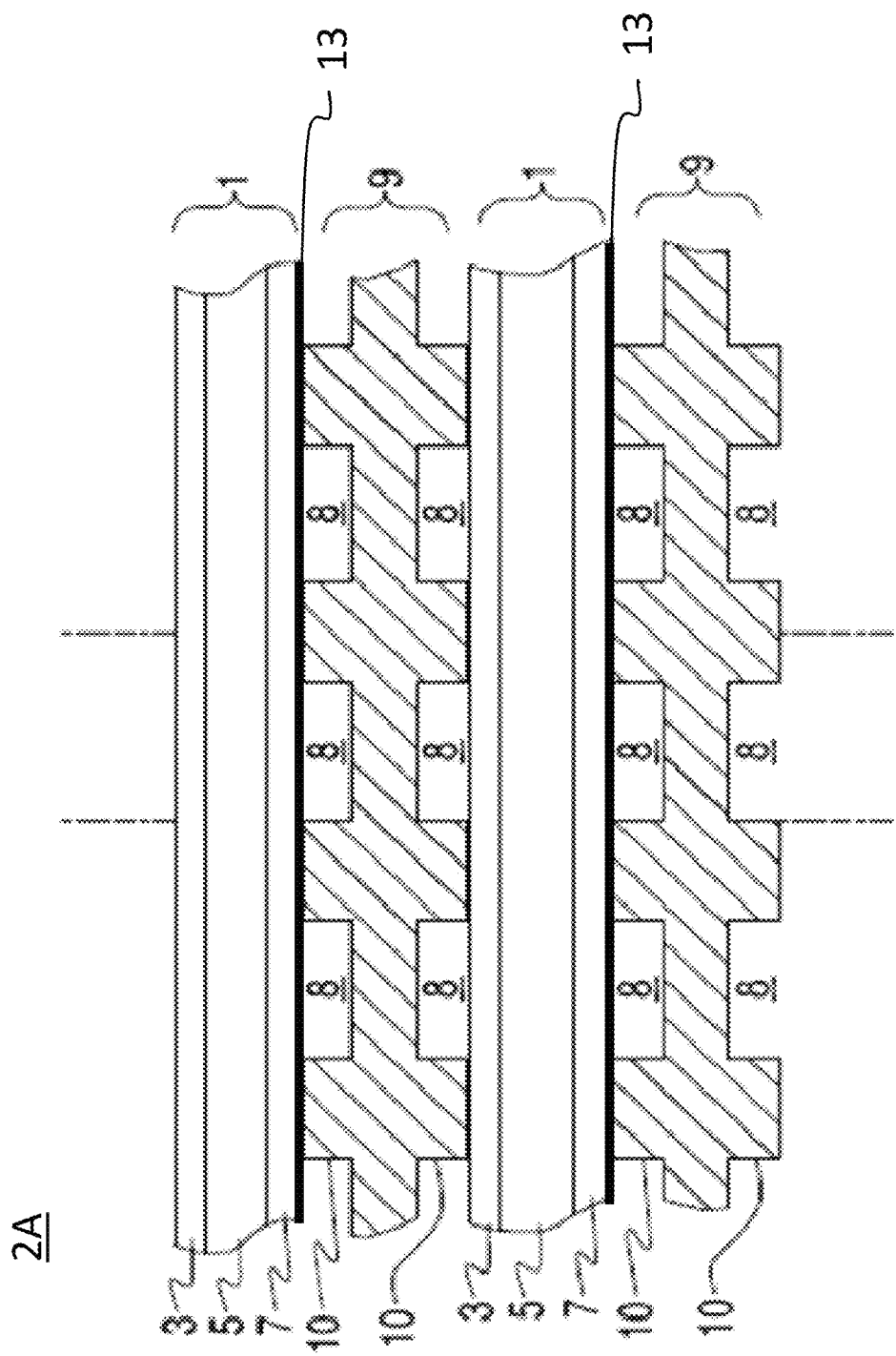
FIGS. 1A and 1B are schematic side cross sectional views of the repeating elements of a fuel cell stack according to embodiments.

One method of achieving a low resistance electrical contact between an electrode of a fuel cell, such as a cathode of the fuel cell, and the adjacent interconnect is by adding an electrically conductive contact print ink between the electrode and the interconnect. The ink can be made from a variety of materials including the electrode material, such as the cathode material, itself. However, while the ink may help achieve good electrical contact, it may also introduce new failure modes if the contact ink is rigid or difficult to print.

According to an embodiment of the present disclosure, an electrically conductive, compliant contact material can be applied to an interconnect and/or to an electrode of a fuel cell, such as a solid oxide fuel cell. The compliant contact material is deposited as an ink which contains a plasticizer in addition to a binder to increase the compliance of the material. The compliant material allows for excellent electrical contact between the fuel cell electrode and the interconnect without applying extra pressure to the delicate fuel cell. The result is a fuel cell stack that may have both better performance and higher yield.

A compliant air side (i.e., cathode side) electrical contact is beneficial in the fabrication of solid oxide fuel cell stacks because that it allows the compliant contact material to conform to the surface of the cathode electrode during stack assembly and firing. This results in a stronger, more continuous interface between the compliant contact material and the cathode electrode. The interface can be either visible or not visible after curing. It also allows for the compliant contact material to flow around high points on the cathode surface, interconnect ribs, or the compliant contact material itself which otherwise could lead to fuel cell cracking.

Compliant layers also increase the tolerances imposed on many prior art stack components. This may result in fewer losses due to tolerance failures, less stringent manufacturing processes and fewer yield failures during both manufacture and stack assembly. This in turn may reduce stack processing costs.

Fuel cell stack assembly includes stacking fuel cells, such as solid oxide fuel cells, and interconnects into a fuel cell stack. Seal precursor materials are provided between adjacent interconnects and fuel cells in the stack. Firing the fuel cell stack may include at least one of "sintering" and/or "conditioning" annealing steps, as described in U.S. Pat. No. 9,065,127 B2, which is incorporated herein by reference in its entirety.

"Sintering" includes processes for heating, melting, and/or reflowing glass or glass-ceramic seal precursor material(s), such as glass or glass-ceramic forming powders and/or glass or glass-ceramic layers in the stack to form the glass or glass-ceramic seals between a fuel cell and two adjacent interconnects in the stack. Sintering may be performed at temperatures greater than 600 degrees Celsius, such as 600-1000 degrees Celsius, including 700-800 degrees Celsius, 800-900 degrees Celsius, 700-900 degrees Celsius, 900-950 degrees Celsius, and/or 950-1000 degrees Celsius. "Conditioning" includes processes for reducing a metal oxide (e.g., nickel oxide) in an anode electrode to a metal (e.g., nickel) in a cermet electrode (e.g., Ni-zirconia electrode, such as Ni—YSZ and/or Ni-scandia stabilized zirconia electrode, or Ni-doped ceria (e.g., scandia doped ceria) anode) and/or heating the stack during performance characterization/testing. Conditioning may be performed at temperatures from 750-900 degrees Celsius, such as 800-850 degrees Celsius, and may be performed with fuel and air flowing to respective cell anodes and cathodes. The sintering and conditioning processes may be conducted independently, in succession, or in any order. Preferably, the sintering and conditioning is performed on a fuel cell (e.g., SOFC) stack which is supported on the same support structure during both sintering and conditioning (e.g., during stack firing).

Preferably, the sintering and the conditioning of the fuel cell stack are performed during the same thermal cycle. As used herein, "performing a process during the same thermal cycle" means the process is performed without cooling back to room temperature. Preferably, the sintering and the conditioning of the fuel cell stack are performed during the same thermal cycle (i.e., without cooling the fuel cell stack to room temperature between sintering and conditioning) while the fuel cell stack is located on and/or in the same support structure. The support structure may include a temporary base pate which supports the stack during sintering and/or conditioning and which is removed from the stack before the stack is placed on a hot box base in the hot box for operation (i.e., electricity generation). Alternatively, the support structure may include a portion of or an entire hot box base which is placed in the hot box and supports the fuel cell stack during operation (i.e., electricity generation).

In an embodiment, a compliant contact material, such as a cathode compliant contact material, is arranged between a fuel cell electrode (e.g., cathode) and an interconnect in the fuel cell stack. Alternatively, an anode compliant contact material may be arranged between the anode electrode and an adjacent interconnect in the fuel cell stack in addition to or instead of providing the cathode compliant contact material between the cathode electrode and the adjacent interconnect in the fuel cell stack.

Preferably, the compliant contact material remains compliant during stack assembly and firing but then becomes rigid after the stack is fired and put into operation. In an embodiment, the plasticizer added to the compliant contact print ink burns off during stack firing, resulting in the formation of a rigid contact material. However, in other embodiments, the contain material may remain compliant after firing.

Any suitable compliant (i.e., elastic at the fuel cell operating temperatures), electrically conductive contact material which is compatible with the electrode (e.g., cathode) of fuel cells, such as SOFCs may be used. Preferably, the compliant contact material does not itself degrade or cause adverse chemical reactions when placed in contact with electrically conductive ceramics, such as lanthanum strontium manganite (LSM) or lanthanum strontium cobaltite (LSC), that are used as SOFC cathode electrodes, or electrically conductive cermets, such as nickel-yttria-stabilized zirconia (YSZ), nickel-scandia-stabilized zirconia (SSZ), or nickel-samaria doped ceria which are used as SOFC anode electrodes. In an embodiment, the as-deposited compliant material may comprise an electrically conductive material, a plasticizer, a solvent and a binder. The as deposited material may also include dispersant in some embodiments. However, in other embodiments, the dispersant may be omitted.

FIG. 1A schematically illustrates a portion of a solid oxide fuel cell stack 2A according to a first embodiment of the present disclosure. The stack includes a plurality of fuel cells 1, each of which includes an electrolyte 5 located between anode 3 and cathode 7 electrodes, and a plurality of interconnects 9 which also function as gas separator plates located between and separating adjacent fuel cells 1. The interconnect 9 electrically connects the anode electrode 3 of one cell 1 to a cathode electrode 7 of the adjacent cell 1.

Any suitable materials may be used in the fuel cell stack 2A. For example, if the fuel cell stack 2A is a SOFC stack of SOFCs 1 and interconnects 9, then the SOFC 1 electrolyte 5 may comprise a ceramic material, such as such as yttria-stabilized zirconia (YSZ), scandia-stabilized zirconia (SSZ), ceria-ytterbia (SSZ), or another ionically conductive oxide material, alone or in combination with the above materials. The anode electrode 3 may comprise a cermet, such as nickel-YSZ, nickel-SSZ, or nickel-samaria doped ceria. The cathode electrode 7 may comprise a noble metal, such as platinum and/or an electrically conductive ceramic material, such as lanthanum strontium manganite (LSM), lanthanum strontium cobaltite (LSC), or other conductive perovskite materials. The interconnect 9 may comprise an electrically conductive ceramic or a metal alloy, such as a chromium-iron alloy (e.g., 4-6 weight percent iron—balance chromium alloy), lanthanum chromite ($LaCrO_3$), iron based alloys (e.g., iron alloys containing Cr, Mn and/or W, such as 302, 409, 439, 434 or Crofer 22 stainless steels), nickel based alloys (e.g., nickel alloys containing Cr, Mo, Fe and/or Mn, such as Haynes 230 or 242 or Inconel 718) or other alloys.

The stack 2A also contains the compliant cathode contact material 13 which is located between the interconnect 9 and the cathode electrode 7 of an adjacent SOFC 1. In this embodiment, the compliant cathode contact material 13 is deposited on the entire cathode electrode 7 and contacts the ribs 10 of the adjacent interconnect 9. The compliant materials will be described in more detail below.

The interconnect 9 contains gas flow channels 8 located between the ribs 10 and facing the anode and cathode electrodes of adjacent fuel cells 1. The channels 8 may be parallel to each other as shown in FIG. 1A. Alternatively, the channels 8 may be perpendicular to each other for cross gas flow on opposite sides of the interconnect 9. Of course, the channels 8 may extend in any direction between parallel and perpendicular from each other if desired.

It should be noted that the stack 2A shown in FIG. 1A, may be oriented upside down or sideways from the exemplary orientation shown in FIG. 1A. Furthermore, the thickness of the components of the stack 2A is not drawn to scale or in actual proportion to each other, but is magnified for clarity.

Figure 1B:
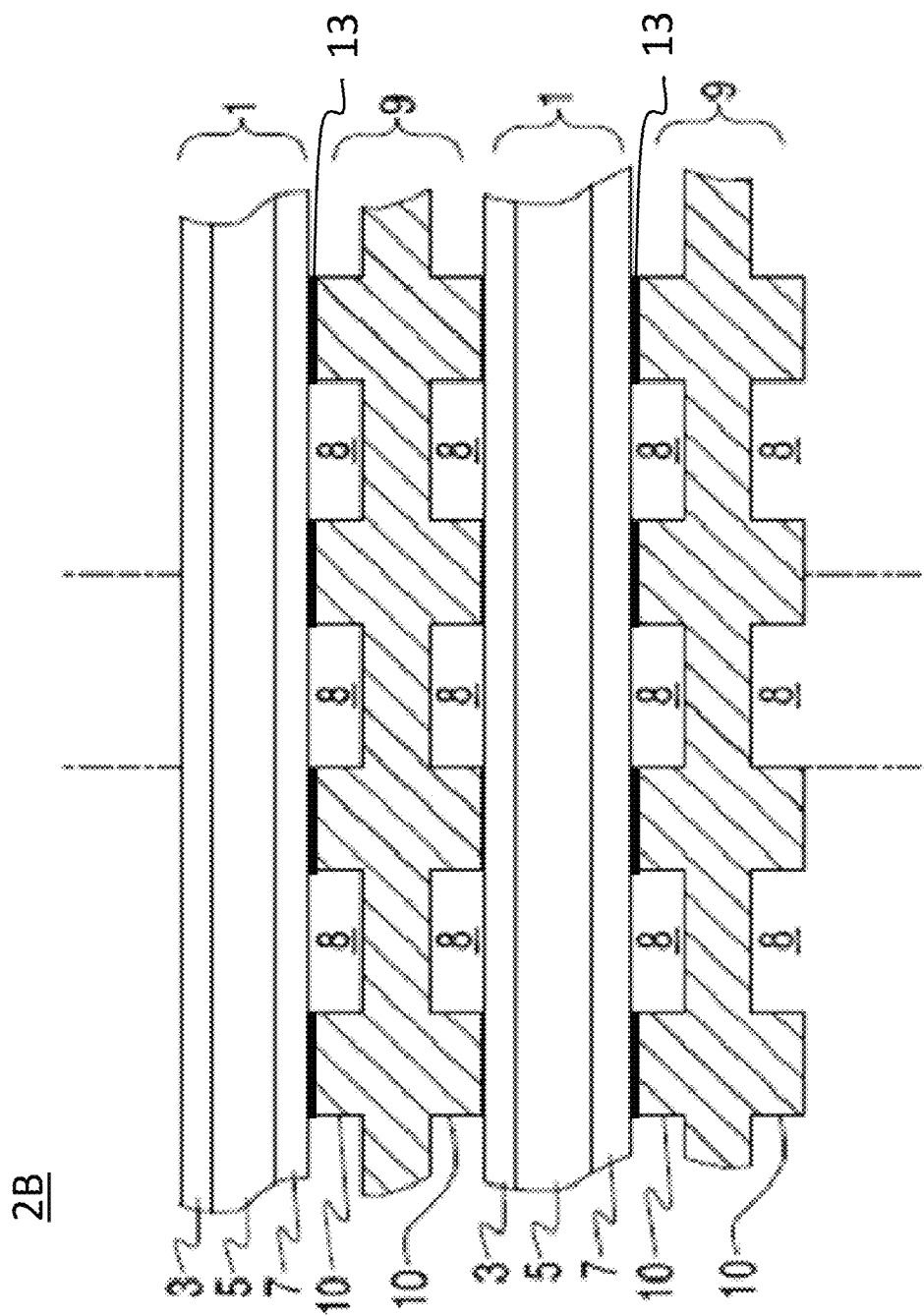

FIG. 1B illustrates a SOFC stack 2B according to a second embodiment of the present disclosure. In this embodiment, the compliant cathode contact material 13 is deposited on top of the ribs 10 of the interconnect 9 facing the cathode electrode 7 of an adjacent SOFC 1. In this embodiment, the compliant cathode material 13 is located only between the ribs 10 of the interconnect 9 and the adjacent SOFC 1 cathode electrode 7, but is not present between the channels 8 in the interconnect 9 and the cathode electrode 7 of the adjacent SOFC 1.

In an embodiment, a compliant anode (i.e., fuel side) contact material, such as a nickel based felt, may be used in the stacks 2A or 2B instead of or in addition to the compliant cathode contact material 13 because the compliant anode contact material allows degrees of movement every second layer up the height of a stack. While the compliant anode contact material is not shown in FIGS. 1A and 1B, it may be located between the anode electrode 3 and the adjacent interconnect 9.

The compliant contact print ink may comprise any electrically conductive material which is compatible with the SOFC 1 cathode 7. In an embodiment, LSM powder is used as the electrically conductive material in the ink. However, other materials, such as lanthanum strontium cobaltite (LSC), lanthanum strontium ferrite (LSF), manganese cobalt oxide (MCO), platinum or other variants and combinations thereof with each other and/or with LSM may also be used. In an embodiment of making the compliant contact print ink, the electrically conductive material is mixed with an organic binder system that can contain any of a variety of solvents, such as terpineol, and a binder such as an ethylcellulose based binder.

Prior art inks that only contain an electrically conductive material, a solvent and a binder may be very rigid and hard. To make the ink more compliant, a plasticizer is added to change the dry properties of the ink. Example plasticizers include, but are not limited to, benzyl butyl phthalate (BBP), dibutyl phthalate (DBP), polyethylene glycol (PEG), dimethyl phthalate (DMP), poly-glycerol-dodecanoate (PGD), diacetylated monoglyceride (such as Myvacet™ 9-45 NF and Myvacet™ 9-45K), or N-alkyl-(C8-C18) pyrrolidone, including N-octyl-2-pyrrolidone, 1-lauryl-2-pyrrolidone, C-8 pyrrolidone (such as Flexidone™ 100), C-12 pyrrolidone (such as Flexidone™ 300). The weight of the plasticizer can range from 20% to 50% of the weight of the binder in the ink. Further, adding plasticizers to the ink formulation has the added advantage of allowing the user to tailor the rheology and drying properties of the ink.

The ink may be dried and/or cured (i.e., debindered) by annealing at an elevated temperature after deposition on the SOFC 1 and/or on the interconnect 9. The drying may evaporate the solvent during a lower temperature anneal and the curing may outgas/burn off the organic components of the ink, such as the binder and plasticizer, during a subsequent higher temperature anneal. The curing anneal forms a rigid contact material comprising the electrically conductive material that remains from the compliant contact print ink. The electrically conductive material may also be sintered by annealing at a higher temperature than the curing temperature if desired. The curing step may be carried out after the SOFCs 1 and/or the interconnects 9 coated with the compliant cathode contact material 13 are placed into a fuel cell stack 2A or 2B such that the compliant cathode contact material 13 is located between and physically contacts both the interconnect 9 and the electrode (e.g., the cathode electrode 7) of the fuel cell 1. The curing anneal and/or the cathode contact material sintering anneal may occur simultaneously with the above described fuel cell stack firing anneal (e.g., during sintering and/or conditioning of the stack). The compliant cathode contact material 13 located in the fuel cell stack 2A or 2B forms a rigid contact material that does not contain any plasticizer or may contain only a residue of the plasticizer after the curing anneal (e.g., after firing the fuel cell stack).

The compliant nature of the as-deposited contact material has several advantages over contact materials that do not include a plasticizer as deposited. In a first advantage, the compliant contact print ink is able to deform around any pre-existing high points on the surface of the solid oxide fuel cell or the surface of the interconnect when the parts (e.g., the cell and the interconnect) are placed into contact. These high points could otherwise cause breakage of the SOFC during stack assembly and firing. In a second advantage, the compliant contact print ink may conform to any large scale variations in flatness between the SOFC and the interconnect. This advantage provides a wide and continuous connection along the entire SOFC/interconnect interface.

The compliant contact print ink can be applied to the SOFC or to the interconnect in any pattern and can be fully or partially dried and/or cured depending on the properties desired. In an embodiment, a similar soft compliant contact print ink can be made for the anode electrode with the same advantages. In this embodiment, materials compatible with the anode electrode would be used.

FIG. 2A is a schematic illustration of a conventional non-compliant contact material 14 deposited on an interconnect 9 rib 10. The conventional structure 100 included a non-compliant cathode contact material 14 (i.e., which lacks a plasticizer as deposited), located between the cathode electrode 7 and the adjacent rib 10 of the interconnect 9. As can be seen in FIG. 2A, the conventional contact material 14 results in a contact having a relatively small contact area 15 with the cathode electrode 7. The small contact area 15 results in an increase in the resistivity, reducing the performance of the SOFC stack.

FIG. 2B is a schematic illustration of an interface of a SOFC cathode electrode 7 and interconnect 9 according to one embodiment of the present disclosure. The embodiment structure 200 includes a compliant cathode contact material 13 which includes a plasticizer as deposited, located between the cathode electrode 7 and the adjacent interconnect 9. In contrast to the structure 100 illustrated in FIG. 2A, the contact area 16 between the compliant contact material 13 and the cathode 7 is larger. Thus, the embodiment structure 200 has a lower resistance between the cathode electrode 7 and the compliant cathode contact material 13. The addition of the plasticizer to the compliant contact print ink results in a compliant contact material that forms a seamless and continuous cathode electrode 7 to compliant cathode contact material 13 transition.

FIG. 3 is a schematic illustration of a compliant contact material 13 flowing around a perturbation or object 18 (such as a bump or foreign particle) on the cathode electrode 7. As can be seen in FIG. 3, even if the surface of the cathode electrode 7 includes a perturbation or object 18 thereon, when the compliant contact material 13 is applied, a smooth, wide contact area 16 is formed as the compliant contact material 13 flows around the perturbation or object 18.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A solid oxide fuel cell (SOFC) stack, comprising:
    an interconnect comprising ribs separated by channels;
    a solid oxide fuel cell comprising an electrolyte located between an anode electrode and a cathode electrode; and
    a contact material composition comprising a compliant contact print ink, the compliant contact print ink comprising:
    an electrically conductive material;
    a plasticizer;
    a solvent; and
    a binder,
    wherein the contact material composition is located between and contacts the cathode electrode and the ribs of the interconnect.

2. The solid oxide fuel cell stack of claim 1, wherein the electrically conductive material comprises at least one of lanthanum strontium manganite (LSM), lanthanum strontium cobaltite (LSC), lanthanum strontium ferrite (LSF), manganese cobalt oxide (MCO) or a combination thereof.

3. The solid oxide fuel cell stack of claim 1, wherein the solvent is terpineol and the binder is ethylcellulose.

4. The solid oxide fuel cell stack of claim 1, wherein the contact material composition comprises from about 20 wt % to about 50 wt % of the plasticizer, based on a total wt % amount of the binder included in the contact material composition.

5. The solid oxide fuel cell stack of claim 1, wherein the plasticizer comprises at least one of benzyl butyl phthalate (BBP), dibutyl phthalate (DBP), dimethyl phthalate (DMP), diacetylated monoglyceride, polyethylene glycol, N-alkyl-(C8-C18) pyrrolidone or poly-glycerol-dodecanoate (PGD).

6. The solid oxide fuel cell stack of claim 5, wherein the plasticizer comprises the diacetylated monoglyceride.

7. The solid oxide fuel cell stack of claim 1, wherein:
    the contact material composition is capable of deforming around bumps or foreign particles on a surface of the cathode electrode or on a surface of the ribs of the interconnect; and the contact material composition conforms to variations in flatness between the cathode electrode and the interconnect.

8. The solid oxide fuel cell stack of claim 1, wherein when cured in physical contact with the cathode electrode, the contact material composition does not form a visible interface with the cathode electrode.

\* \* \* \* \*